(12) United States Patent
Koegel

(10) Patent No.: US 8,511,212 B2
(45) Date of Patent: Aug. 20, 2013

(54) CORD WRAP HANDLE

(75) Inventor: Jan Koegel, Arlington Heights, IL (US)

(73) Assignee: Robert Bosch GmbH, Stuttgart (DE)

( * ) Notice: Subject to any disclaimer, the term of this patent is extended or adjusted under 35 U.S.C. 154(b) by 307 days.

(21) Appl. No.: 12/755,881

(22) Filed: Apr. 7, 2010

(65) Prior Publication Data
US 2011/0247471 A1 Oct. 13, 2011

(51) Int. Cl.
*B23D 47/00* (2006.01)
*B23D 45/04* (2006.01)

(52) U.S. Cl.
USPC .................. 83/471.3; 83/859; 30/517

(58) Field of Classification Search
USPC ............. 83/471.3, 859, 102.1, 167, 62, 490, 83/581, 473, 477.1, 34, 471.2, 472, 477, 83/486.1, 698.41; 30/517, 124, 374, 286; 242/388.6, 402, 403, 405.2, 405.3, 400.1
See application file for complete search history.

(56) References Cited

U.S. PATENT DOCUMENTS

| 2,814,136 | A | * | 11/1957 | Sebok | 38/90 |
| 4,123,012 | A | * | 10/1978 | Hough | 242/405.2 |
| 4,177,961 | A | * | 12/1979 | Gruenewald | 242/405.2 |
| 4,585,194 | A | | 4/1986 | Schwob | |
| 5,531,333 | A | | 7/1996 | Vara | |
| 6,286,777 | B1 | * | 9/2001 | Black | 242/388.6 |
| 7,004,785 | B2 | | 2/2006 | Melton et al. | |
| 7,062,870 | B1 | * | 6/2006 | You | 38/88 |
| 7,175,473 | B1 | | 2/2007 | Clapp et al. | |
| 2003/0110914 | A1 | * | 6/2003 | Brazell et al. | 83/471.3 |
| 2005/0092155 | A1 | | 5/2005 | Phillips et al. | |
| 2008/0173147 | A1 | * | 7/2008 | Kovarik et al. | 83/62 |
| 2009/0313881 | A1 | * | 12/2009 | Troutman | 43/107 |

FOREIGN PATENT DOCUMENTS

| WO | WO 2006/002154 | 1/2006 |
| WO | WO 2009/058169 | 5/2009 |

* cited by examiner

*Primary Examiner* — Ghassem Alie
(74) *Attorney, Agent, or Firm* — Maginot, Moore & Beck

(57) ABSTRACT

A miter saw includes a base, a table rotatably mounted on the base, a blade and motor assembly pivotally coupled to a frame support that is attached to the table, and a power cord coupled to the blade and motor assembly. The frame support, the base, and/or the blade and motor assembly also comprises a handle portion that includes a grip with an opening disposed at an outer end thereof, with the grip also having a pair of arcuate surfaces disposed at opposing sides thereof for retaining the power cord when wrapped around both surfaces.

9 Claims, 12 Drawing Sheets

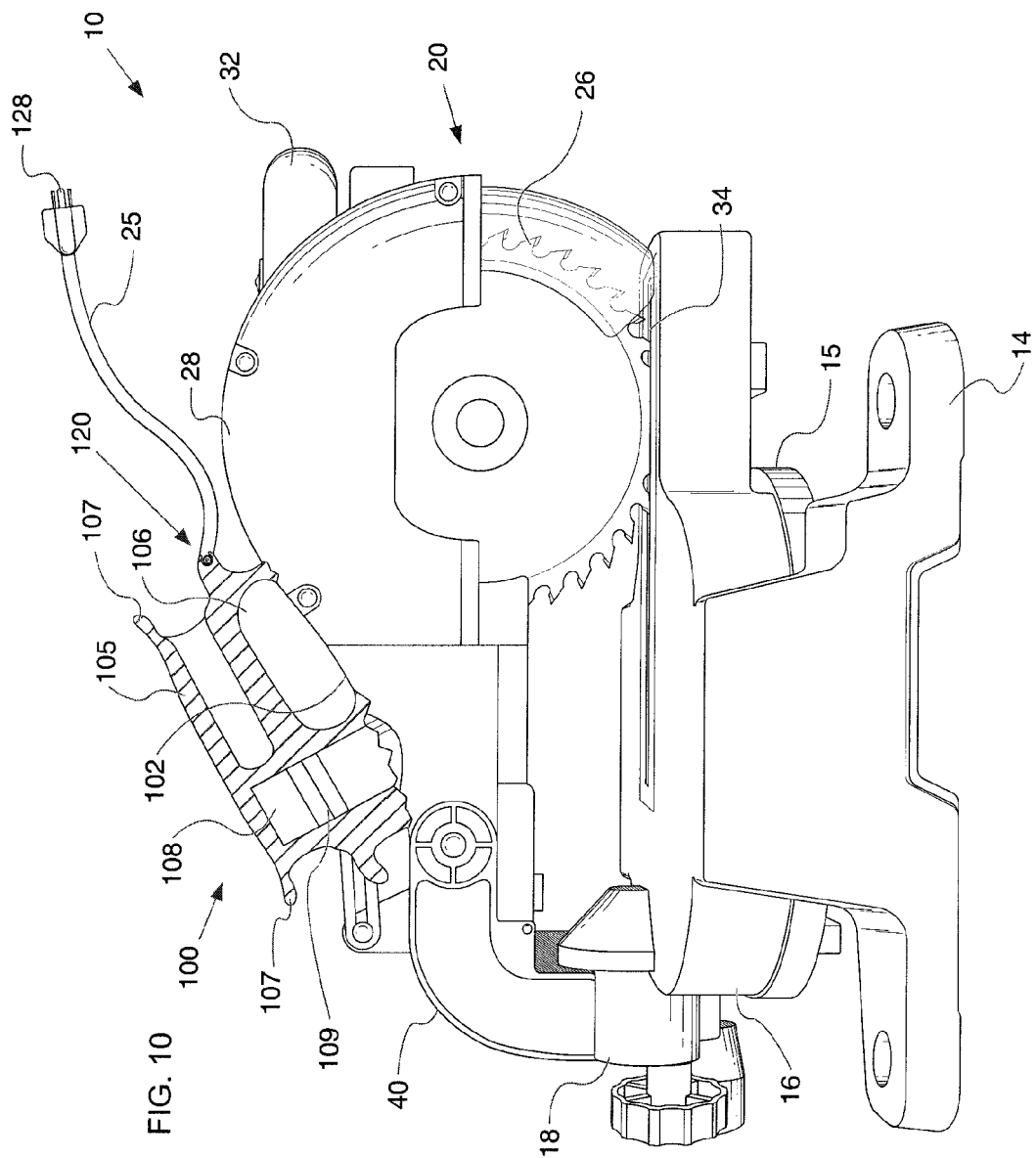

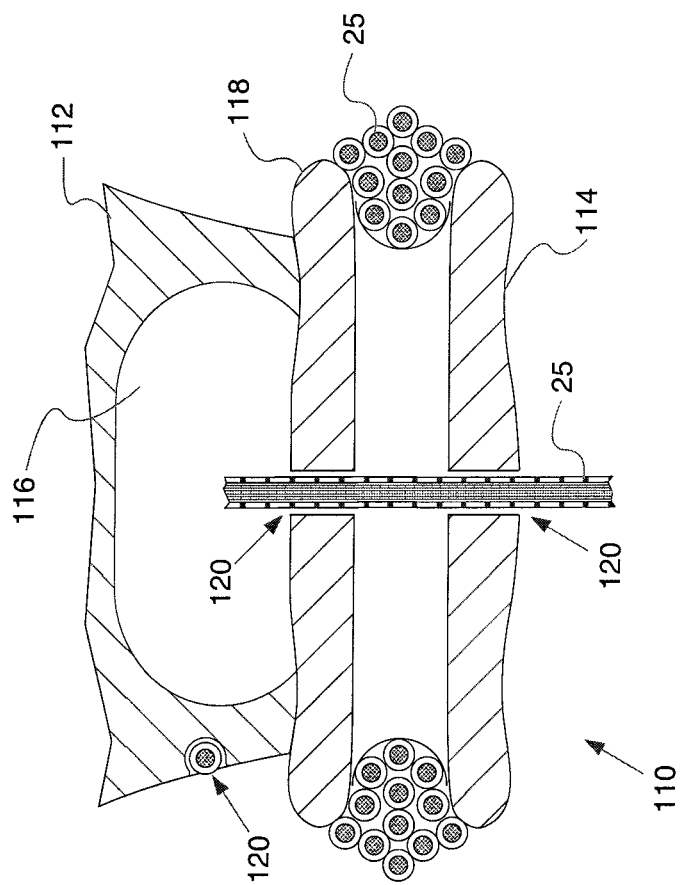

CORD WRAP HANDLE

BACKGROUND OF THE INVENTION

The present invention relates generally to power tools. Embodiments of the present invention relate more particularly to a power tool having a handle for carrying that also provides a location for wrapping a cord.

Power miter saws have long been used to cut work pieces such as trim, molding, and the like in which precise angled cuts are required. Such miter saws generally include a base on which a rotatable table is mounted. The table typically is adjustable around a center pivot axis, so that a user can adjust the angle of the table relative to a fence. A blade and motor assembly is attached to the table and can be lowered into a cutting position. It is common for the table to have angular indicia and a detent mechanism so that a user can quickly rotate the table to a desired angular position so that cuts can be made.

Though miter saws are convenient for use, the present inventor has discovered that portability for miter saws can present problems. For example, it is often inconvenient for a user to carry miter saws by hand before and after use, due to their generally asymmetric shape, significant weight, and lack of convenient surfaces for handling. Further, the present inventor has discovered that even when a user can carry the bulk of a miter saw, the power cord as well as other loose components remain displaced, adding to the inconvenience of transporting such tools.

SUMMARY OF THE INVENTION

Embodiments of the present invention provide a handle portion for a miter saw. The miter saw includes a base, a table rotatably mounted on the base, a blade and motor assembly pivotally coupled to a frame support that is attached to the table, and a power cord coupled to the blade and motor assembly. In an embodiment of the present invention, the frame support also comprises a handle portion that includes a grip with an opening disposed at an outer end thereof, with the grip also having a pair of arcuate surfaces disposed at opposing sides thereof for retaining the power cord when wrapped around both surfaces. In other embodiments, either the blade and motor assembly or the base also comprise a handle portion.

BRIEF DESCRIPTION OF THE DRAWINGS

FIG. 10 is a side elevation view of a miter saw having a cord wrap handle portion (shown in section) as part of an upper guard of a blade and motor assembly and further including a cord clamp, according to an eighth embodiment of the present invention; and FIG. 11 is a top plan view of a cord wrap handle portion as shown in FIGS. 5-7, including cord clamps.

DETAILED DESCRIPTION

Figure 1:
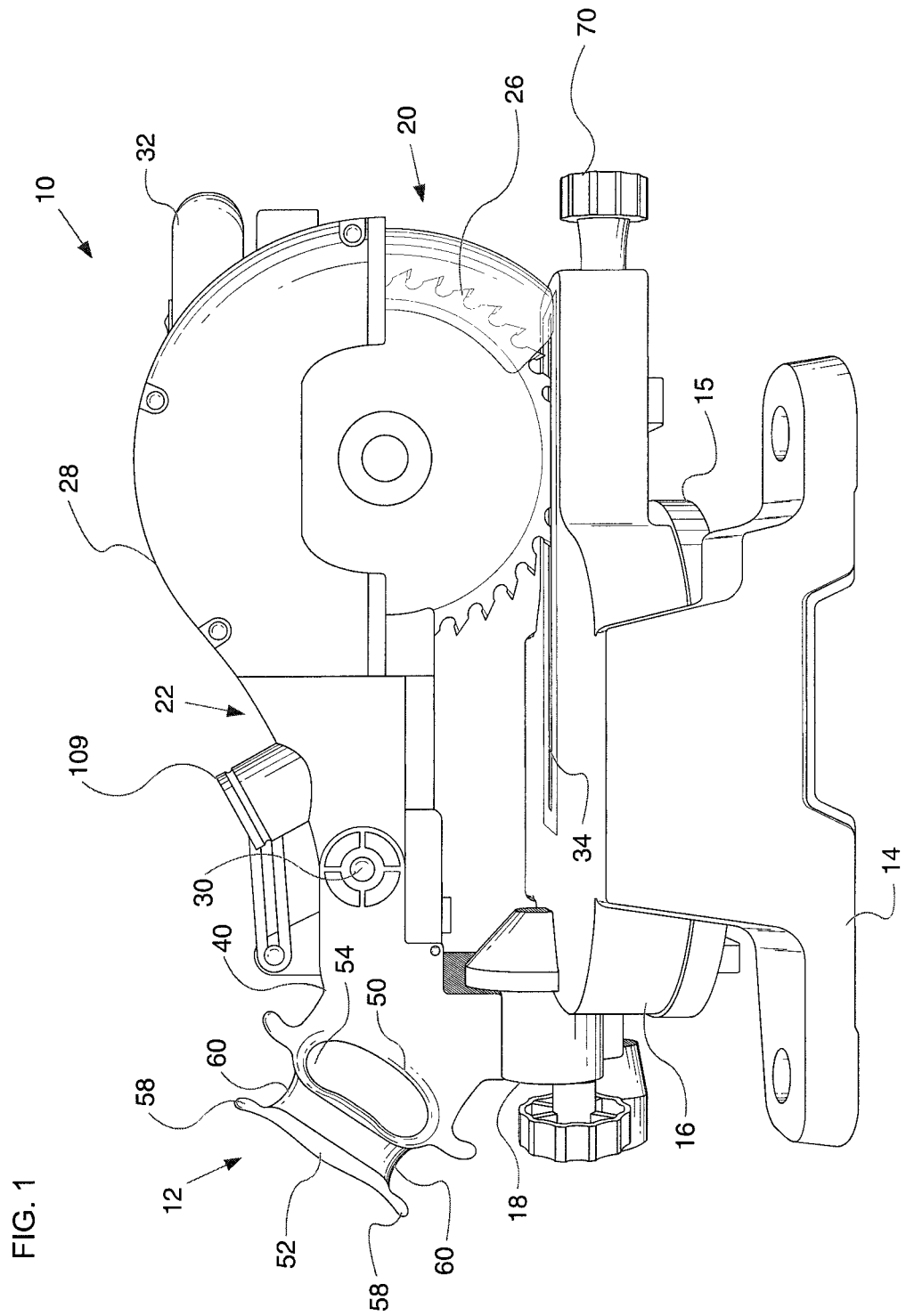
FIG. 1 is a side elevation view of a power miter saw having a frame support with an integrated handle portion including a cord wrap, according to a first embodiment of the present invention.

Cords of power tools usually do not have a certain area to be stored. A loose or hanging cord is not convenient when carrying the tool around. Some carrying handles are known for benchtop tools. However, for tools such as power miter saws, there has not been a handle provided in the art for storing a cord to provide benefits such as easier storage, easy transportation, better convenience of carrying, compact storage and packing, and other benefits.

Embodiments of the present invention provide, among other things, a combination handle and cord wrap for a power miter saw. Particularly, a power miter saw includes a base, a table rotatably mounted on the base and having a rearward support frame attached thereto and extending upwardly therefrom, a blade and motor assembly pivotally coupled to the frame support and having an operating handle for lowering the assembly into a cutting position, and a power cord coupled to the blade and motor assembly and configured to be connected to a power source. In example embodiments, the frame support, the base, and/or the blade and motor assembly further includes a handle portion for transporting the miter saw. The handle portion includes a grip with an opening disposed at an outer end of the grip, and may include a base extending beyond the grip. The grip and/or the base has a pair of arcuate surfaces are disposed at opposing sides configured to retain the power cord when wrapped around the surfaces.

Preferably, but not necessarily, the handle, including the grip and the pair of arcuate surfaces, is integrally formed with a portion of the miter saw, such as but not limited to the base, blade and motor assembly, support frame, etc. This reduces additional part costs. Alternatively, the handle portion can be coupled to one or more of these components, and such coupling can be fixed or movable depending on the embodiment.

In some example embodiments, the handle portion is movable, such as by linear movement, pivoting, sliding, etc., while in other embodiments, the handle portion may be fixed. The handle portion may be located at any of various positions on the miter saw. Nonlimiting examples include an upper guard area of a blade and motor assembly, a side or front of a base, and a support frame that provides a bevel arm for the miter saw. A preferred position for the handle portion will depend on considerations such as, but not limited to, the center of gravity of the miter saw, the size of the miter saw, the location that provides more convenient portability, etc. It is preferred that the handle be disposed at a location near the center of gravity of the miter saw. In a nonlimiting example embodiment, the handle is integrated in an already existing part, and thus additional part costs are reduced or eliminated. In particular example embodiments, the handle portion further includes a cord clamp for retaining a portion of a cord. The cord clamp may be integrated into the grip, base, and/or one or more of the arcuate surfaces of the grip or base. Example embodiments of the present invention thus allow a power cord and plug coupled to the blade and motor assembly to be stored for convenient transportation and packaging. Many different ways of convenient carrying using example handles are provided.

Turning now to the drawings, FIG. 1 shows an example miter saw, indicated generally at 10, including a handle portion, indicated generally as 12, according to a first embodiment of the present invention. Generally, the miter saw 10 includes a base 14 with a generally circular portion 15 on which a rotatable table 16 is attached. A miter arm control assembly, indicating generally at 18, is coupled to the rotatable table 16 and is provided for adjusting the horizontal angular position of a saw blade and motor assembly (indicated generally at 20) and thus setting the miter angle for cutting a work piece that would be placed on the table.

The saw blade and motor assembly 20 is operatively connected to the table 16 by a linear guide mechanism, indicated generally at 22. An electric motor in the saw blade and motor assembly 20 is operatively connected through a gear mechanism that drives a saw blade 26, the electric motor and gear mechanism not being shown but located within a housing portion 28. A power cord 25 coupled to the blade and motor assembly 20 supplies power to the motor. To position the blade 26 for cutting the blade and motor assembly 20 is pivotable about a horizontal shaft 30. A blade handle 32 (operating handle) is provided for use by an operator to bring the blade and motor assembly 20 from a rest position where it is elevated relative to the table 16 to a lowered cutting position as shown in FIG. 1 if a work piece is placed on the table.

The table 16 has a slot 34 that enables the blade 26 to be lowered to a position below the top surface of the table. In this way, the blade 26 can cut completely through the work piece during a cutting operation. The linear guide mechanism 22, which provides a sliding action to extend the linear capacity of the saw 10, is disposed within a rearward support frame 40, which provides a bevel arm for the saw. This support frame 40, attached to the table 16 and extending upwardly therefrom, is rotatable with respect to the table via the miter arm control assembly 18 to set the miter angle. The blade and motor assembly 20 is pivotally coupled to the support frame 40 via the pivot 30. The combination of the support frame 40 being pivotable with respect to the table 16, the blade and motor assembly 20 being pivotable with respect to the support frame, and the table being rotatable around the base 14 gives the saw 10 a compound cutting action.

During operation, an operator places a work piece on the table 16, brings the blade handle 32 down into cutting position after activating the motor by pivoting the blade and motor assembly 20, and makes a chop cut on the work piece. If a sliding cut is need for increased capacity, the operator can use the blade handle 32 to pull the blade and motor assembly 20 to a forward position, where the work piece will be engaged, activate the motor, bring the handle 32 down into a cutting position, then push the handle toward the work piece to cut it.

The table 16 and miter arm control assembly 18 allow selection of cutting position and miter angles.

With general components of the example miter saw 10 being explained, more particular description of handle portions according to embodiments of the invention will be provided. In the description and drawings herein, like parts of the miter saw 10 will be shown and described by like characters. The handle portion 12 shown in FIG. 1, part of the frame support 40, extends from the frame support along a deforming direction of the miter saw 10. The handle portion 12 includes a base 50 extending from the support frame 40. A grip 52 is disposed at an outer portion of the base 50, and the base joins the handle portion 12 to the support frame 40. Thus, the base 50 can be generally defined as the part of the handle portion 12 between the grip 52 and the part from which the handle portion extends (in the miter saw 10 shown in FIG. 1, the support frame 40). The grip 52 includes an opening 54. In operation, a user can place his/her fingers around the grip 52 and insert one or more of the fingers through the opening 54.

A grip, such as the grip 52 in this embodiment handle portion 12 or for other embodiments disclosed herein, may be generally cylindrical, or many other shapes, such as but not limited to those shown in the accompanying figures herein. Further, the handle portion 12 may include more than one grip. Further, a grip, such as the grip 52 in this embodiment handle portion or for other embodiments disclosed herein, may be solid or hollow, flexible or rigid, one piece or multiple pieces, and it may be of the same material as the base 50, the support frame 40 (or other component of the miter saw 10 from which the handle portion extends), or of a different material, partially of the same material (for example, integrated with the support frame and/or the base but with an additional inner or outer portion of a different material), or of a different material, though it is preferred that at least part of the grip be of the same material as the support frame (or other component of the miter saw 10 from which the handle portion extends, depending on the embodiment) to provide an integrated handle. Those of ordinary skill in the art will appreciate that many variations for the grip 52 are possible.

The handle portion 12, as with other example handle portions described herein, is preferably provided at a position such that it extends in a deforming direction of the miter saw 10. More particularly, the handle portion 12 preferably is positioned on the miter saw 10 so that, if the handle portion is used as a single handle to lift the miter saw over a surface (e.g., ground, a floor, etc.), the grip 52 is disposed substantially over a center of gravity of the miter saw. Further, in this lifting and/or carrying position, the length of the grip 52 preferably (but not necessarily) is oriented along a direction substantially parallel to the surface. More preferably, the grip 52 in this position is substantially perpendicular to the center of gravity. With this positioning and orientation, the handle portion 12 allows favorable leverage for a user lifting and carrying the miter saw. Additionally, the handle portion 12 preferably is positioned such that when the handle portion is raised to this lifting and/or carrying position, the handle portion can located as close to a user as possible, so that the body of the miter saw 10 interferes with the user as little as possible as the miter saw is lifted and/or carried.

For providing a cord wrap, a pair of arcuate surfaces 58 are formed at opposing sides 60 of the grip 52 (as shown in FIG. 1) or the base 50. The arcuate shape provides opposing ends for wrapping and retaining a cord such as the power cord 25 around the surfaces. The arcuate surfaces 58, for this embodiment or for other embodiments herein, may be separate pieces or part of the same piece, and may be integrated (that is, as a single, continuous piece of like material) with the base 50, formed as part of the base, or separate from the base. Further, the arcuate surfaces 58 for this embodiment or for other embodiments herein, may be formed as part of the grip 52 or integral with the grip in some embodiments, or in other embodiments may be separate from the grip.

It is preferred, though not required, that the handle portion 12 be integrally formed from an already present portion of the miter saw 10 to reduce the need for additional components. For example, the handle portion 12 shown in FIG. 1 can be formed from the material (e.g., plastic) used for the support frame 40.

FIG. 1 also illustrates how the handle portion 12 can be used either alone or in combination with a knob 70 disposed on the miter saw. The knob 70 adjusts an angular position of the table 16. As will be appreciated by those of ordinary skill in the art, the knob 70 may be rotatable to tighten the table 16 in a desired position and/or includes a releasable lock for doing so.

If both the knob 70 (or other secondary handle) and the handle portion 12 can be used to lift and/or carry the miter saw 10, it is preferred that the handle portion 12 and the knob 70 be positioned on the miter saw such that when the handle portion and the knob are used to lift the miter saw above the surface, the handle portion, the knob, and the center of gravity of the miter saw are disposed substantially collinearly, and that the handle portion and the knob are substantially symmetrically opposed to one another with respect to the center of gravity of the miter saw. This optimizes leverage when using the handle portion 12 and the knob 70 in combination (for example, in a two-handed lifting and/or carrying position).

Figure 2:
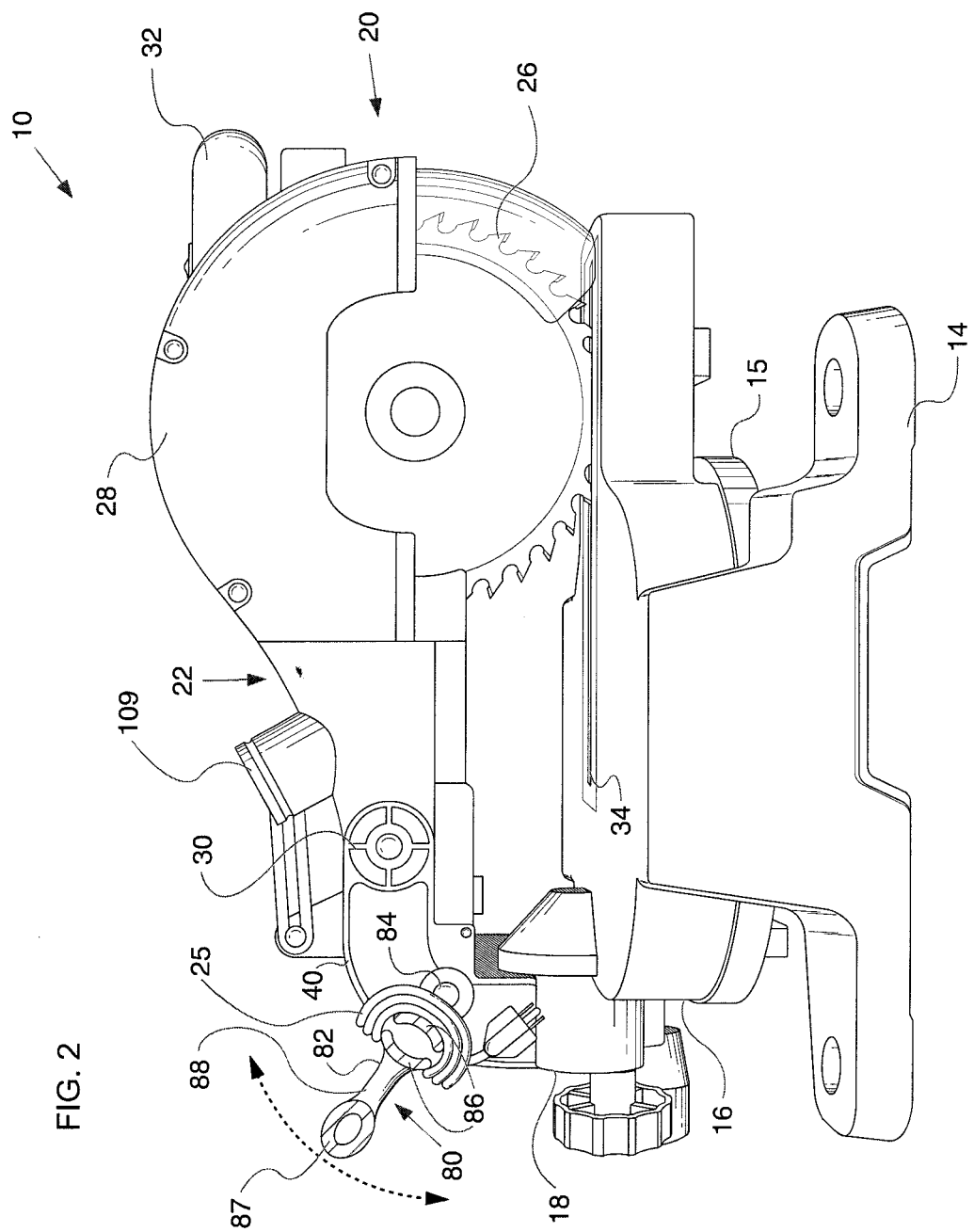
FIG. 2 is a side elevation view of a miter saw including a frame support with a pivoting handle portion including a cord wrap, according to a second embodiment of the present invention, with a portion of the pivoting handle portion shown in section for clarity.

FIG. 2 shows a handle portion 80 according to another embodiment. The handle portion 80 in this embodiment is not integrally formed with the miter saw 10, but instead is rotatably coupled to a portion of the miter saw, which in this example is the support frame 40. Other movable couplings that are possible include, but are not limited to, linear movement, angular movement, and sliding. The example handle portion 80 includes a grip 82 that is coupled to the support frame 40 by a pair of opposing hinges 84. In a part of the grip 82 disposed more closely to the support frame 40, opposing arcuate surfaces 86 are provided for wrapping the power cord 25. An outer end 87 of the grip 82, pivotable via the hinges 84, is generally cylindrical. The grip 82 includes an opening 88, which may be enclosed, but need not be in all embodiments. Also, as the handle portion 88 is not integrally formed with a portion of the miter saw 10, the grip 82, hinges 84, arcuate surfaces 86, and/or the outer end 87 of the grip may be of the same or different materials as the portion of the miter saw to which the handle 88 is mounted (e.g., the support frame 40).

Figure 3:
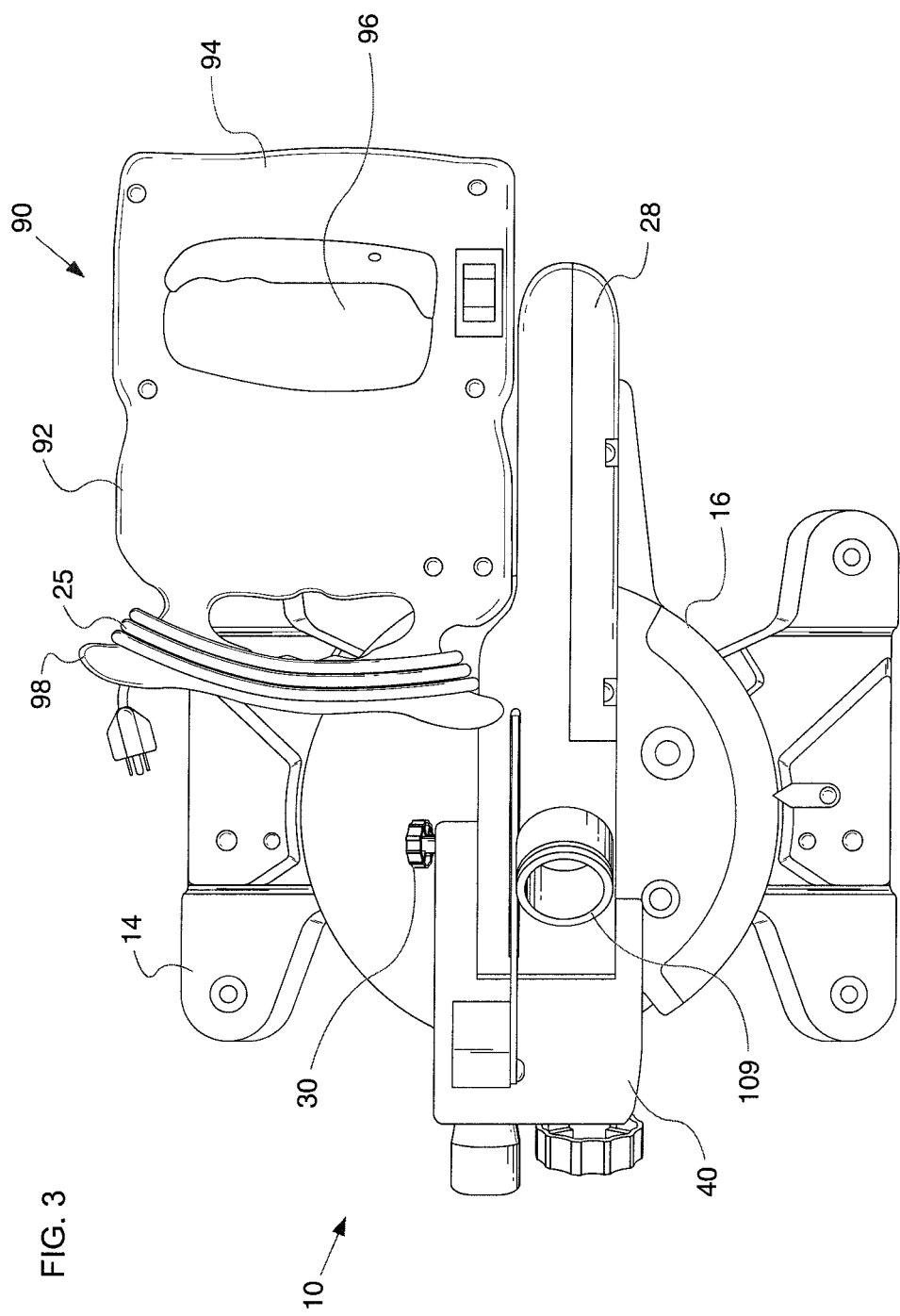
FIG. 3 is a top plan view of a miter saw having an integrated handle portion as part of a blade and motor assembly, according to a third embodiment of the present invention.

FIG. 3 shows another integrated handle portion 90 according to another embodiment of the present invention. The handle portion 90 is integrated with the motor housing 28 of the blade and motor assembly 20, in the area of the motor. Alternatively, the handle portion 90 may be coupled to the motor housing 28 or other part of the blade and motor assembly 20. This example handle portion 90 includes a base 92, a grip 94 including an opening 96, and a pair of arcuate surfaces 98 for wrapping the cord 25.

Figure 4:
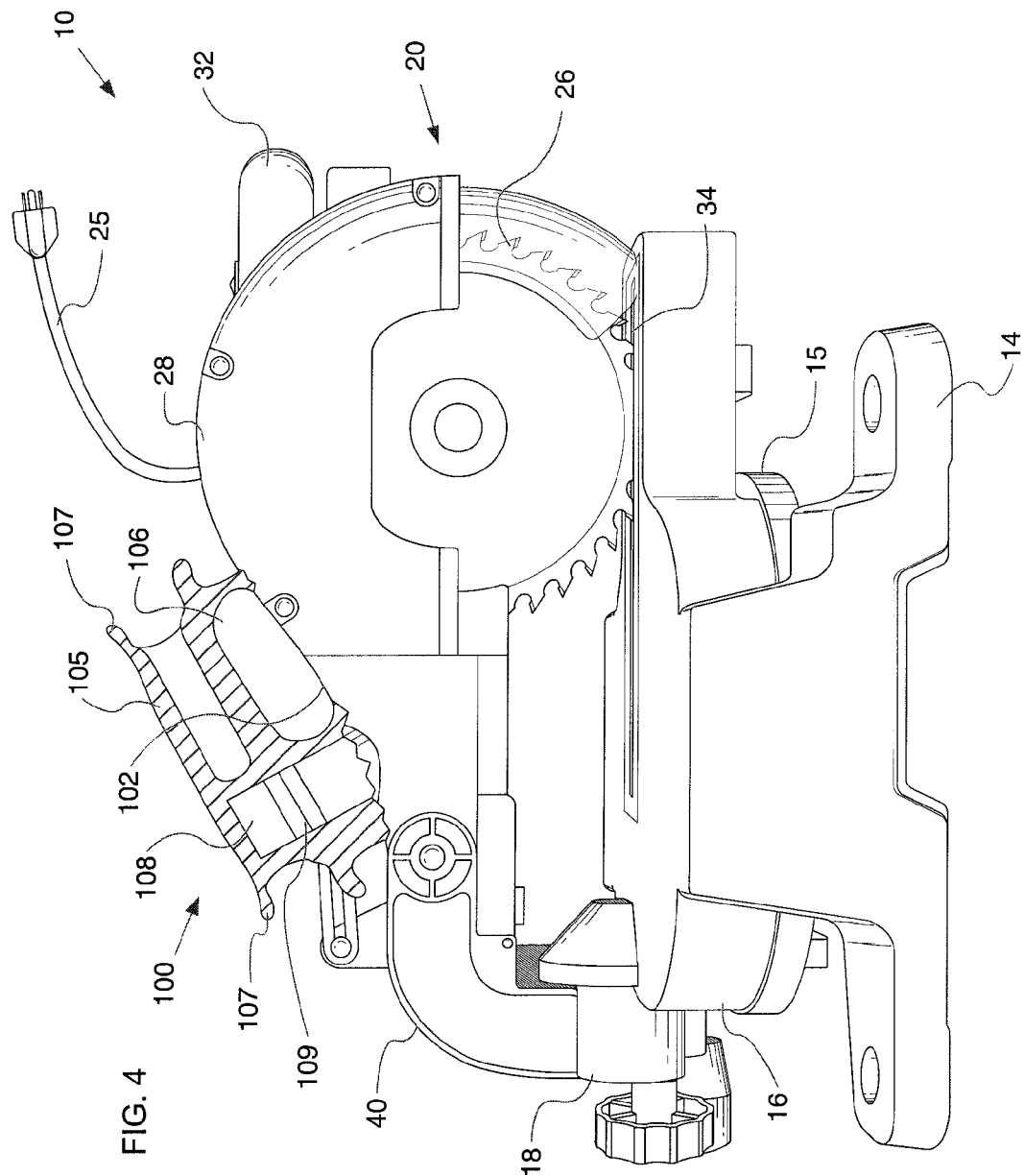
FIG. 4 is a side elevation view of a miter saw having a cord wrap handle portion (shown in section) as part of an upper guard of a blade and motor assembly and including an opening for accommodating an dust hose integrated with the blade and motor assembly, according to a fourth embodiment of the present invention.

FIG. 4 illustrates another embodiment handle portion 100 according to still another embodiment of the present invention. The handle portion 100 is integrated with an upper guard area 102 of the blade and motor assembly 20. The handle portion 100 includes a grip 105 having an opening 106, as well as a pair of opposing arcuate surfaces 107, preferably using the same material as for the upper guard area 102. Additionally, an opening 108 is provided in the handle portion 100 for accommodating a dust hose 109. Thus, the handle portion 100 can aid with storing both the power cord 25 and additional accessories for the miter saw 10.

Figure 5:
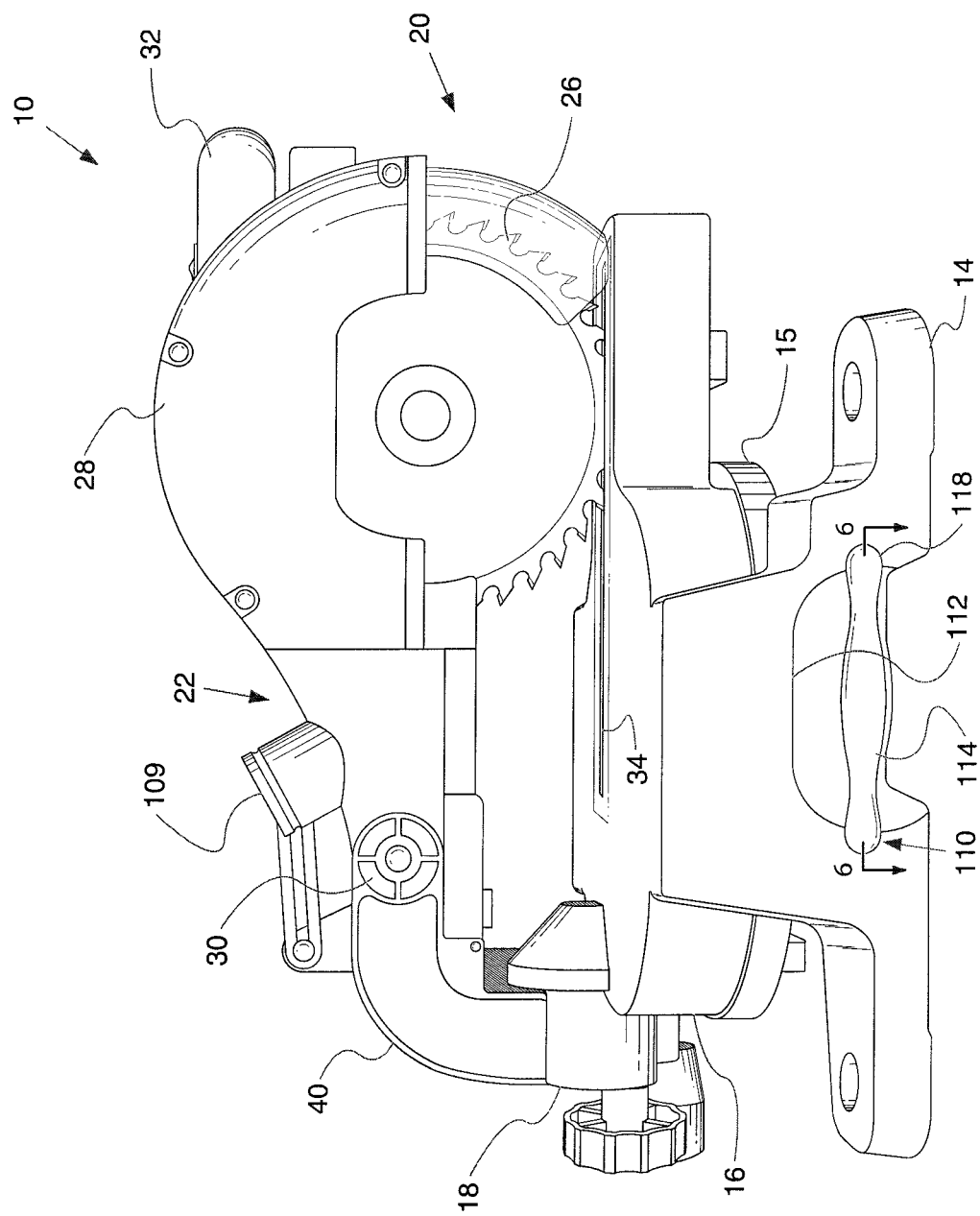
FIG. 5 is a side elevation view of a miter saw having an integrated cord wrap handle portion in a base, according to a fifth embodiment of the present invention.
Figure 6:
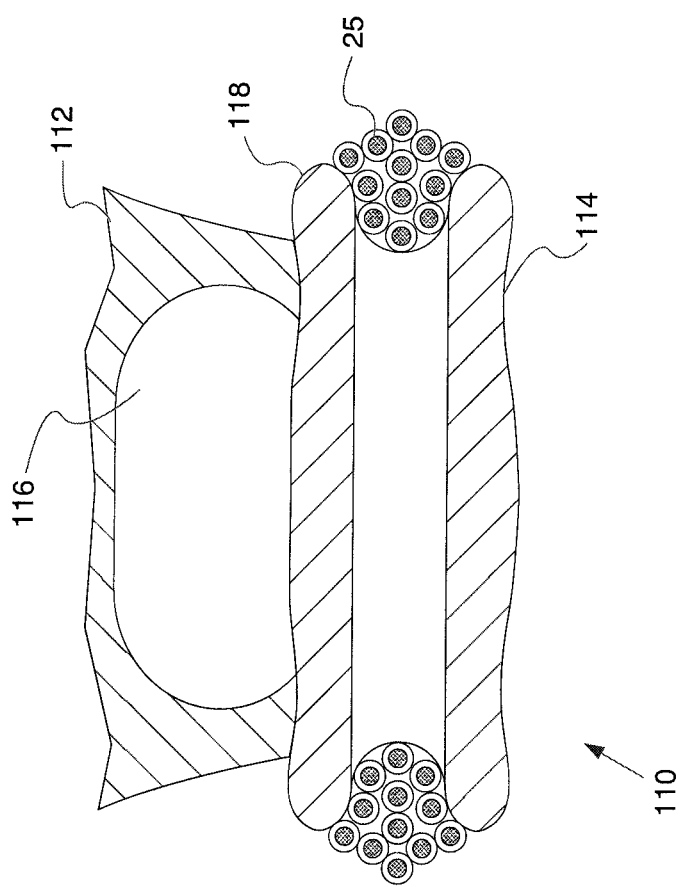
FIG. 6 is a top plan view illustrating the integrated cord wrap handle portion of FIG. 5, with a portion removed for clarity.
Figure 7:
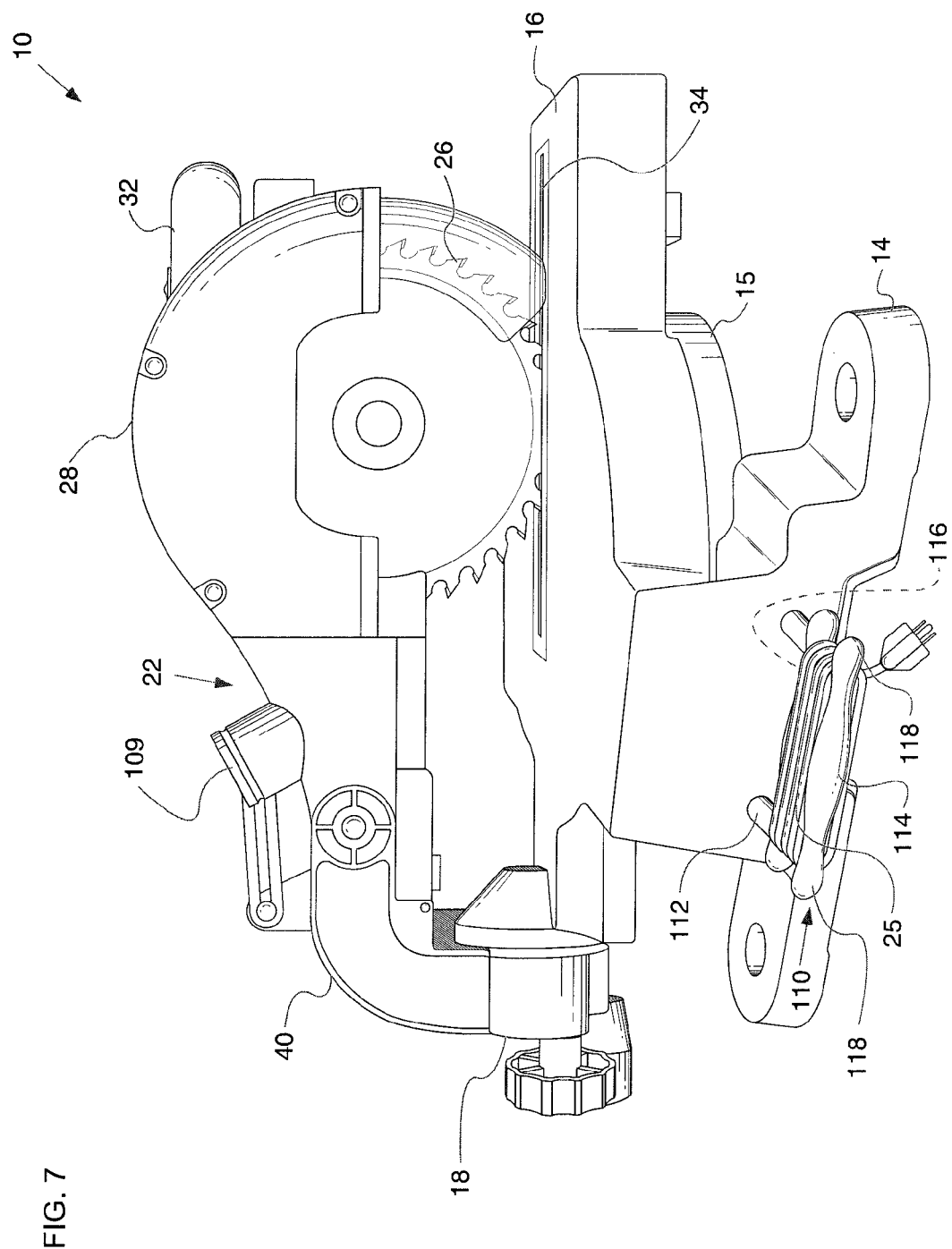
FIG. 7 is a perspective view of the miter saw of FIGS. 5-6.

FIGS. 5-7 show a handle portion 110 that is integrated with the base 14 according to another embodiment of the present invention. This handle 110 includes a grip 114 extending from a portion 112 of the base 14. The grip 114 includes an opening 116 at an outer end. Further, the grip 114 includes a pair of opposed arcuate surfaces 118 for wrapping the power cord 25.

For retaining a portion of the cord 25, a cord clamp may also be provided as part of the handle. Example cord clamps may be integrated into one or more of the base, grip, or one or more arcuate surfaces. After wrapping the cord 25, a user may place a portion of the cord near a plug of the cord, or multiple portions of the cord depending on the number of cord clamps provided.

Figure 8A:
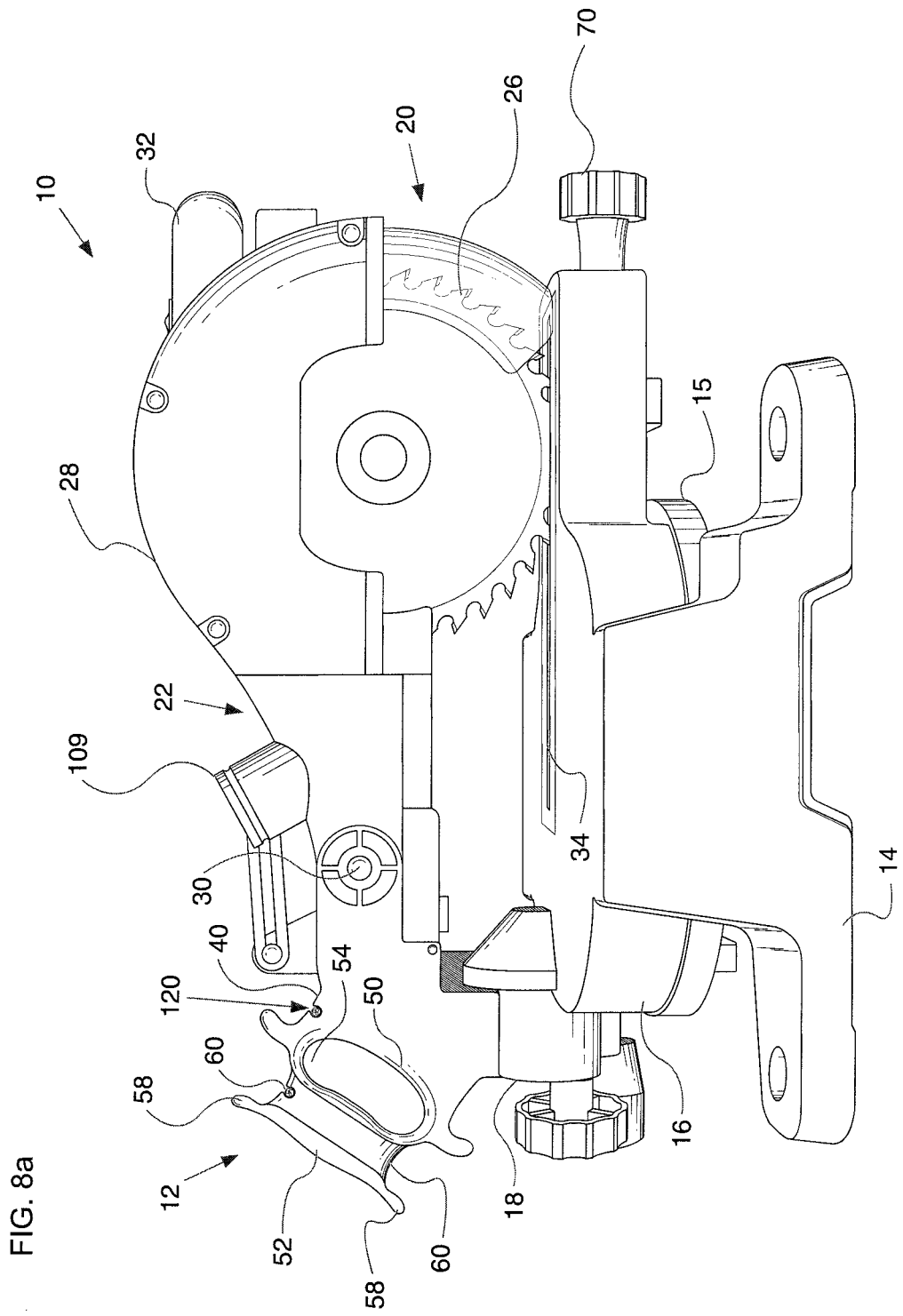
FIG. 8A is a side elevation view of a power miter saw having a frame support with an integrated handle portion including a cord wrap and a cord clamp, according to a sixth embodiment of the present invention.
Figure 8B:
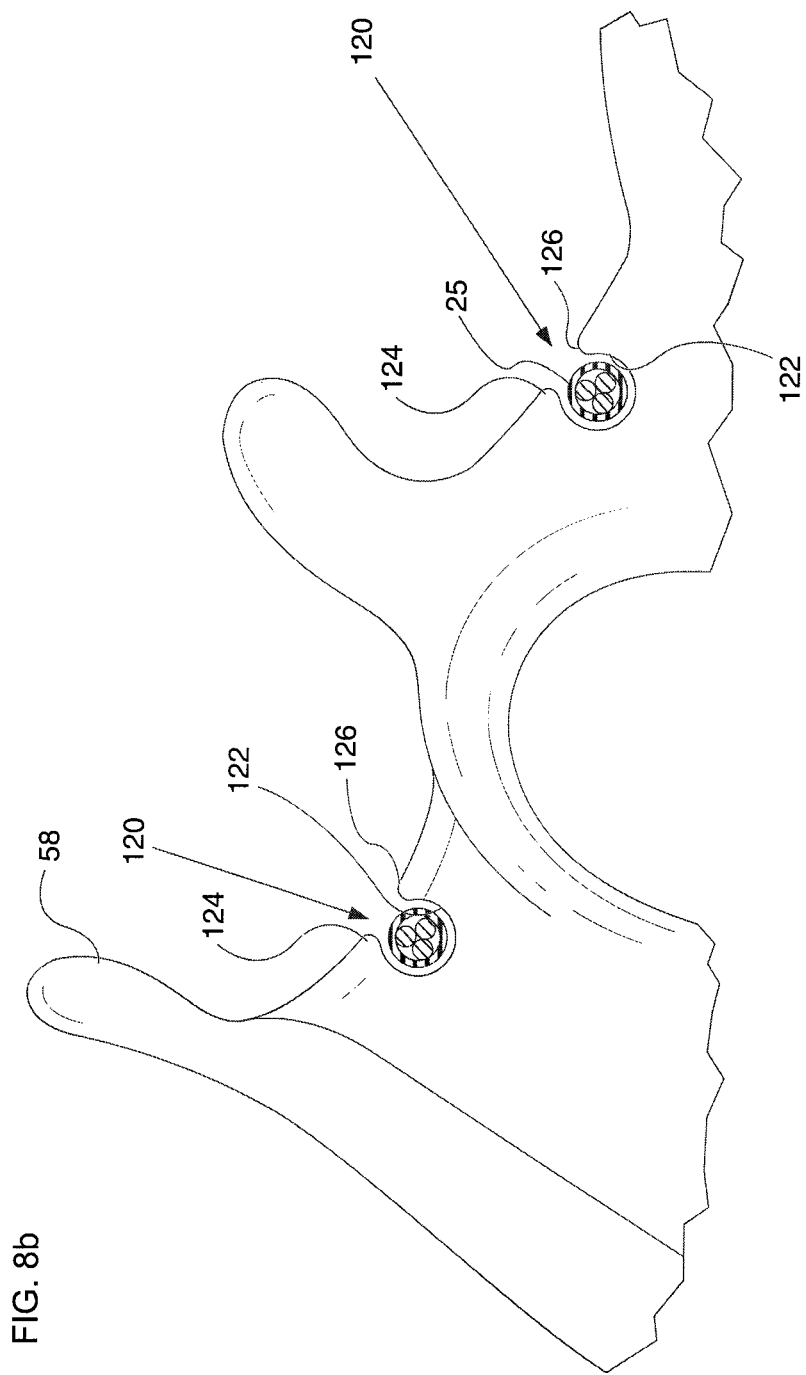
FIG. 8B is an enlarged side elevation view of a portion of the cord wrap and cord clamp of FIG. 8A, showing a cross-section of a cord.

FIGS. 8A-8B show a pair of cord clamps 120 integrated with the miter saw 10 and handle portion 12 of FIG. 1. In FIGS. 8A-8B, both the base 50 and the grip 52 include the cord clamps. The cord clamps 120 may be integrated with the base and the grip (and thus with the support frame 40) by forming an opening within the base and the grip to accommodate the cord, and may be entirely of the same material as the base and the grip, or may include additional material (such as, but not limited to, a rubber or elastomeric outer surface). Those of ordinary skill in the art will appreciate suitable methods for forming the cord clamps 120 within the base 50 or grip 52.

Figure 9:
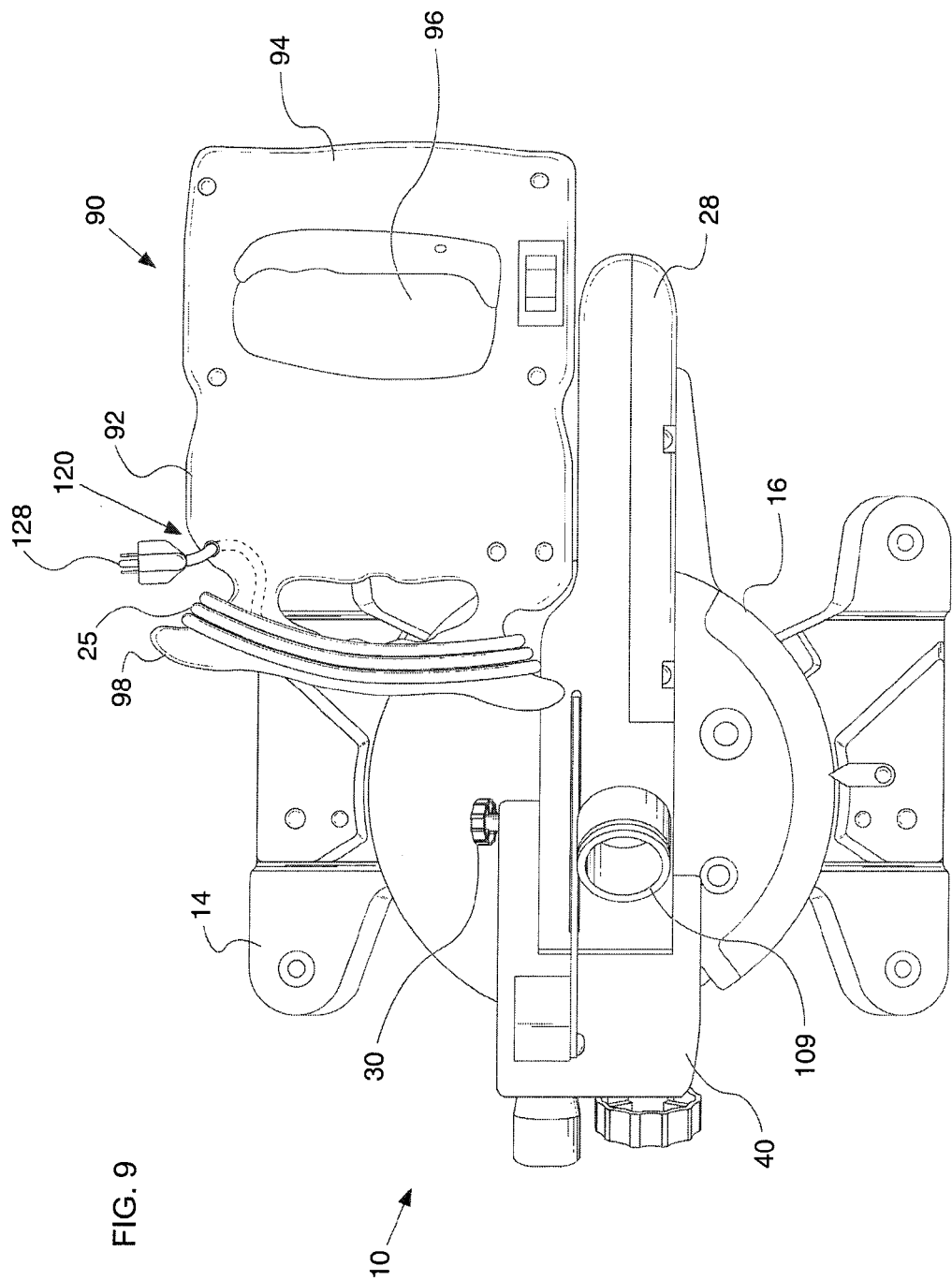
FIG. 9 is a top plan view of a miter saw having an integrated handle portion including a cord clamp as part of a blade and motor assembly, according to a seventh embodiment of the present invention.

As more clearly viewed in FIG. 8B, each of the cord clamps 120 include an opening such as a hollow or notch 122 formed into respective portions of the base 50 and the grip 52, respectively. Each notch 112 forms a passage generally coaxial with the cord 25 when the cord is placed within the notch (such as by pressing the cord into the notch), and the notch is sized to receive the cord 25 therein. For retaining the cord 25 within the notch 112, the cord clamps 120 further include opposing projections 124, 126 projecting inwardly from inner surfaces at portions of the notch. Preferably, the opposing projections are disposed at outer portions of the notch (e.g., near a surface of the handle portion). A user thus may press a portion of the cord 25 near a plug 128 into one or both of the cord clamps 120 and secure the portion of the cord within the notch underneath the opposed projections 124, 126. A simple pull of the cord 25 preferably will remove the cord from the cord clamps. The cord clamps 120 may be integrated into handle portions integrated with other parts of the miter saw 10 as well. FIG. 9 shows a miter saw similar to that shown in FIG. 3, further including the cord clamp 120 integrated with (e.g., formed into) the handle portion 90, which is integrated into the motor housing 28. Similarly, FIG. 10 shows a miter saw similar to that shown in FIG. 4, wherein the cord clamp 120 is integrated with one of the arcuate surfaces 107 of the handle portion 100. FIG. 11 shows a handle portion 110 similar to that shown in FIGS. 5-7, in which the cord clamps 120 are integrated with the portion 112 of the handle base 114 as well as the pair of opposed arcuate surfaces 118. The pair of opposed arcuate surfaces 118 having the cord clamps 120 formed therein can combine to provide a channel that is coaxial with a portion of the cord 25. The user may employ one or more of the formed cord clamps 120 to selectively wrap and retain the cord 25.

While various embodiments of the present invention have been shown and described, it should be understood that other modifications, substitutions, and alternatives are apparent to one of ordinary skill in the art. Such modifications, substitutions, and alternatives can be made without departing from the spirit and scope of the invention, which should be determined form the appended claims.

Various features of the invention are set forth in the appended claims.

What is claimed is:

1. A power miter saw comprising:
   a base;
   a table rotatably mounted on said base and having a rearward support frame attached thereto and extending upwardly therefrom;
   a blade and motor assembly pivotally coupled to said support frame and having an operating handle for lowering said assembly into a cutting position;
   a power cord coupled to the blade and motor assembly configured to be connected to a power source; and
   a handle portion formed on said blade and motor assembly, said handle portion comprising a grip with an opening disposed at an outer end thereof, with the grip having a pair of arcuate surfaces disposed at opposing sides thereof configured to retain said power cord when wrapped around said surfaces, and a cord clamp integrated with the handle portion for retaining a portion of the power cord, the cord clamp comprising an opening formed in the handle portion;
   wherein an opening is provided in the handle portion for receiving and accommodating a dust hose extending from said blade and motor assembly.

2. A power miter saw according to claim 1 wherein the handle portion is integrally formed with said blade and motor assembly.

3. A power miter saw according to claim 1 wherein said handle portion further comprises a handle base disposed between the grip and said blade and motor assembly.

4. A power miter saw according to claim 3 wherein the handle base, the grip, and the arcuate surfaces are integrally formed.

5. A power miter saw according to claim 1 wherein said handle portion extends from an upper guard of said blade and motor assembly.

6. A power miter according to claim 1, wherein the opening within the handle portion for receiving and accommodating the dust hose extending from said blade and motor assembly is included in the grip of the handle portion.

7. A power miter saw according to claim 6 wherein said cord clamp comprises:
   a pair of opposed projections respectively projecting inwardly from an inner surface of said opening.

8. A power miter saw according to claim 7 wherein said cord clamp is integrally formed within the grip.

9. A power miter saw according to claim 7 wherein said handle portion further comprises a handle base disposed between the grip and said blade and motor assembly; and
   wherein said cord clamp is integrally formed within the handle base.

* * * * *